United States Patent [19]
Herrin

[11] 3,838,251
[45] Sept. 24, 1974

[54] METHOD OF INTERPRETING A CODED RECORD

[75] Inventor: Carlos B. Herrin, Bellbrook, Ohio

[73] Assignee: Monarch Marking Systems Inc., Dayton, Ohio

[22] Filed: June 29, 1971

[21] Appl. No.: 157,870

[52] U.S. Cl. ..................235/61.11 E, 340/146.3 H, 340/146.3 Z 235/61.12 N, 250/219 D

[51] Int. Cl. ..... G06k 7/14, G06k 19/06, G06k 9/10, G01n 21/30

[58] Field of Search ....... 340/146.3 Z, 149, 174 SR, 340/174.1 H; 235/61.12 N, 61.11 E, 61.11 D, 61.7 B, 61.11 A; 250/219 D; 178/17

[56] References Cited

UNITED STATES PATENTS

| | | | |
|---|---|---|---|
| 3,238,501 | 3/1966 | Mak | 340/146.3 K |
| 3,273,123 | 9/1966 | Lowitz | 340/146.3 Z |
| 3,286,233 | 11/1966 | Lesueur | 340/146.3 Z |
| 3,519,990 | 7/1970 | Holt | 340/146.3 H |
| 3,553,437 | 1/1971 | Boothroyd | 235/61.11 E |
| 3,588,457 | 6/1971 | Bijleveld | 340/146.3 Z |
| 3,597,752 | 8/1971 | Eldert | 340/174.1 H |
| 3,617,707 | 11/1971 | Shields | 235/61.11 E |
| 3,643,068 | 2/1972 | Mohan | 235/61.11 E |

*Primary Examiner*—Daryl W. Cook
*Assistant Examiner*—Robert M. Kilgore
*Attorney, Agent, or Firm*—Mason, Kolehmainen, Rathburn & Wyss

[57] ABSTRACT

A machine readable, binary record or label includes alternating bars and spaces of different reflectivity in which the widths of the bars and spaces are assigned one of two values representing a binary "1" or a binary "0." The widths of the bars and spaces forming a complete code are individually determined, and the average width of these same bars and spaces is also determined. This average width is then compared with the actual widths of the individual bars and spaces to determine the "1" and "0" significance of the bars and spaces. In this manner, the establishment of a virtual reference width formed by the averaging of the individual bar and space widths renders record interpretation substantially independent of reading speed or apparent bar and space width.

8 Claims, 7 Drawing Figures

PATENTED SEP 24 1974 3,838,251

SHEET 1 OF 5

INVENTOR
CARLOS B. HERRIN

BY
*Mason, Kolehmainen, Rathburn and Wyss.*
ATTORNEYS

PATENTED SEP 24 1974 3,838,251

SHEET 2 OF 5

INVENTOR
CARLOS B. HERRIN

BY
*Mason, Kolehmainen, Rathburn and Wyss*
ATTORNEYS

INVENTOR
CARLOS B. HERRIN
BY *Mason, Kolehmainen, Rathburn and Wyss*
ATTORNEYS

INVENTOR
CARLOS B. HERRIN

BY
*Mason, Kolehmainen, Rathburn and Wyss*
ATTORNEYS.

INVENTOR
CARLOS B. HERRIN

BY
*Mason, Kolehmainen, Rathburn and Wyss*
ATTORNEYS.

METHOD OF INTERPRETING A CODED RECORD

This invention relates to machine readable codes and records and, more particularly, to a new and improved method of interpreting a record encoded with data in the form of areas of different sizes. Certain subject matter disclosed in the present application is claimed in a copending application Ser. No. 157,869 which was filed on June 29, 1971 and which is assigned to the same assignee as the present application.

The need for acquiring data at, for example, a point of sale is well recognized, and many attempts have been made in the past to provide records, tags, or labels and reading and interpreting systems that are capable of being used in retail stores at the point of sale and for inventory. In this application, the records must be easily and economically made and must be such that, for example, handling by customers does not deface the coding or render the code incapable of accurate reading. Further, the record should be such that it can be read either by a portable manually manipulated reader or a stationary machine reader of low cost. Further, when the record or label is to be read by a manual reader, it should be such that the record interpretation is as independent of speed and direction of reading as is possible.

Prior approaches to this problem have used sequential areas or bars of different light reflecting characteristics in which bit value is determined by color. These records are expensive to produce and require somewhat more elaborate reading systems than desirable. Other techniques provide codes in bar or stylized character form with magnetic or light reflecting recordings in which absolute values in a dimension such as width are assigned to the different binary weights or values. These codes can be read serially or in parallel. The parallel codes require plural transducers which cannot be easily accommodated in a portable reader, and the magnetic recordings are also not easily read with manual or portable readers. The sequential bars of varying width are easily read using a single transducer in a portable unit but require either extensive level detection equipment or individual width timers in the interpreting system which are not easily compensated for variations in the manually controlled speed of relative movement between the reader and the record.

Accordingly, one object of the present invention is to provide a new and improved method of interpreting a coded record.

Another object is to provide a new and improved method of interpreting a coded record in which the width of a code area is assigned an absolute binary value and in which a virtual reference width value is derived from the record during reading for use as a standard of width comparison with the individual areas.

Another object is to provide a method of interpreting or translating records coded in areas of two different widths by comparing the widths of individual areas with a reference width established during translation by averaging the widths of the individual areas.

A further object is to provide a method of reading records wherein each character is encoded by a combination of N areas of two fixed widths which includes the steps of determining the widths of each of the N individual areas and then comparing each of the widths with a determined average width of the N areas.

In accordance with these and many other objects, an embodiment of the present invention comprises a record, tag, or label made, for example, of a member having a light reflective surface on which are recorded a plurality of non-reflecting bars. The widths of the non-reflecting bars and the reflecting spaces disposed between and defined by the nonreflecting bars are modulated in width so that a binary "1" is represented by one fixed width, i.e., a wide width, and a binary "0" is represented by another different width, i.e., a narrow width. In one embodiment, each character is represented by a five bit binary code formed by three black or nonreflective bars and the two white bars or spaces separating the three black bars. These records can be easily produced using nothing more than conventional paper or card stock and simple coding elements either individual or in sequence for applying ink or other nonreflective material to the record. The record making apparatus can be such as to sequentially or concurrently record a plural character message, each character comprising a plurality of bits with the message preceded and followed by start and stop codes coded in the same manner as the characters of the message.

This record is interpreted by a manually held light pen including, for example, a light source for directing light onto the record and a light responsive element providing a varying output in dependence on the quantity of reflected light received from the record, although this reading assembly could as well be incorporated into a stationary record reading mechanism. The record is read by producing relative movement between the reader and the record in either a forward or backward direction requiring only that the reader pass across the entire coded message at some point along its length. The analog signal developed by the photoresponsive unit in the reader is digitized into a two-level signal representing white or black and, in dependence on the level and length of this signal, gates a free running clock into five counters in sequence on level transitions so that at the end of three bars, the five counters store representations of the widths of the three bars and two spaces.

To establish a virtual reference for comparison with the five stored widths, three comparison counters are provided, each supplied with the clock output divided by five (the number of bits in a complete character code). Each of the three comparison counters is enabled on a different black bar so that at the end of each combination of five bars and spaces, the average width of the related five bars and spaces is stored in the comparison counter. Each of these average widths is compared in sequence in a comparator with the five related widths stored in the five counters so that, in the assumed example, a "1" is established if the stored width exceeds the average width, and a "0" is established if the stored width is less than the average or reference width. The width and comparison counters are sequentially cleared and loaded in a proper sequence as bit detection progresses.

Each detected bit is shifted into the input of a character shift register, and the contents of the character shift register is continuously decoded in a control-character decoder. This continues until such time as a start code is recognized when the record is read in the forward direction or a stop code is recognized when the record is being read in a backwards or reverse direction. At this time, the decoder sets a storage element indicating whether the record is being read in the forward or reverse direction and shifts the mode of operation of the interpreting circuit from a scanning mode of operation to reading mode. This operation includes assigning one of the comparison registers with correct timing to establish the average width or reference value for subsequent message character detection.

The next plural bit character is then read into the storage register in the manner described above using the width counters, the assigned comparison register or counter, and the comparator. When all of the bits of the first character of the message have been shifted into the shift register, the contents of the shift register are read out in one direction to a utilization device, such as a lamp display or the input of a data processor, if the record is being read in a forward direction. If the data is being read in a reverse direction, the contents of the shift register are reversed in order and then read out to the display or data processor in an opposite order. The remaining characters of the message are processed in this manner until such time as the start or stop code is detected, depending on the direction of reading. At this time, the decoding circuit returns the interpreting system from the read mode to the scan mode in preparation for reading the next message.

By using as a width reference for comparison with the stored bit widths, a value derived during the reading of the stored widths, variations in reading speed, for instance, cause like and proportionate changes in the average width and bit widths, and velocity errors are eliminated. Further, this is accomplished without adding to the basic code. Further, the use of a number of comparison registers in the scan mode permits continuous monitoring for a valid start using the virtual reference for width comparison.

Many other objects and advantages of the present invention will become apparent from considering the following detailed description in conjunction with the drawings in which.

Figure 1:
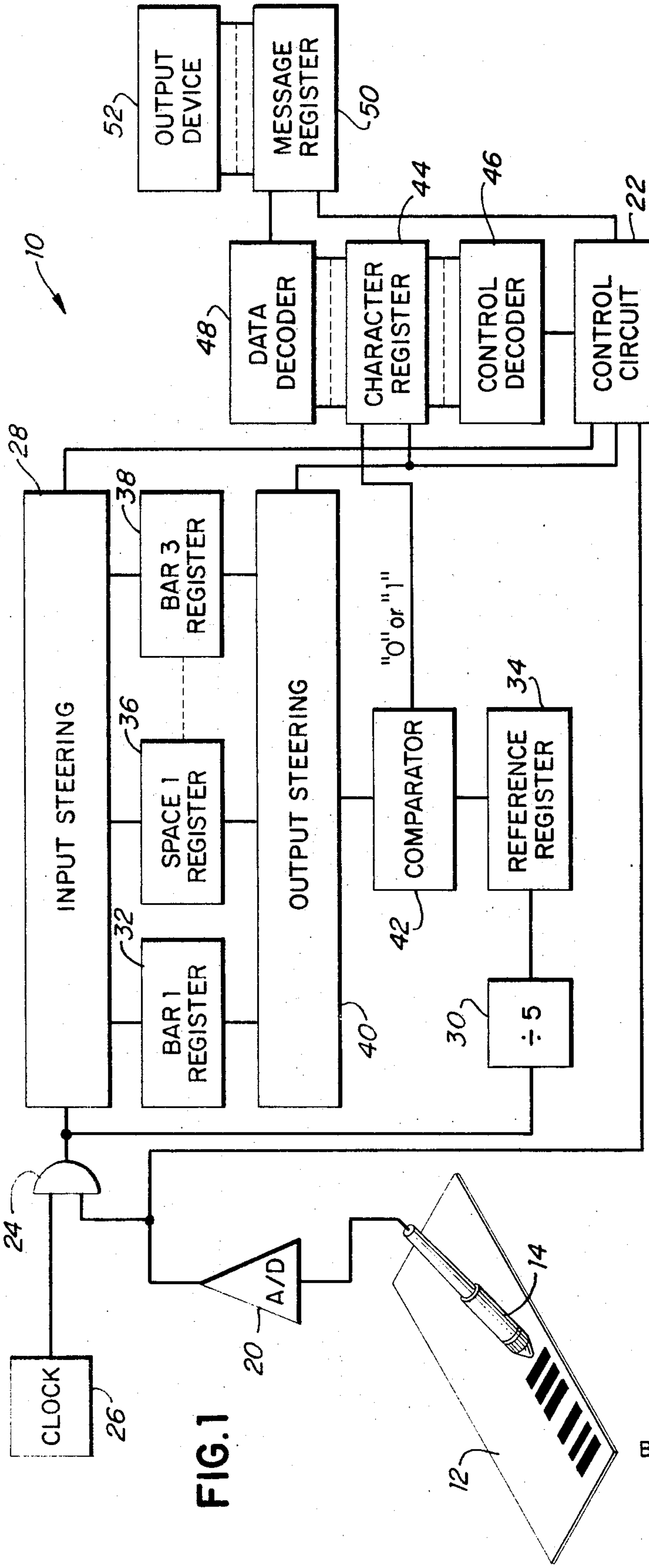
FIG. 1 illustrates a record in conjunction with a reader and interpreting circuit which embodies the present invention and which is shown in simplified block form.

Referring now more specifically to FIG. 1 of the drawings, therein is illustrated a system indicated generally as 10 for interpreting a bar coded record 12. In the coding used on the record 12, the widths of the bars and spaces varies in accordance with the bit value to be encoded so that when relative movement is produced between the record 12 and an optical reader 14, the apparent width varies in dependence on the speed of relative movement. In accordance with the present invention, the system 10 includes means for establishing a virtual reference or average width during the actual scanning of the record 12 by the reader 14 against which the widths of the bars and spaces can be compared so that the true binary significance of the encoded data can be accurately determined substantially independent of reading speed and without the requirement of additional indicia over and above the usual bar code on the record 12.

Figure 2:
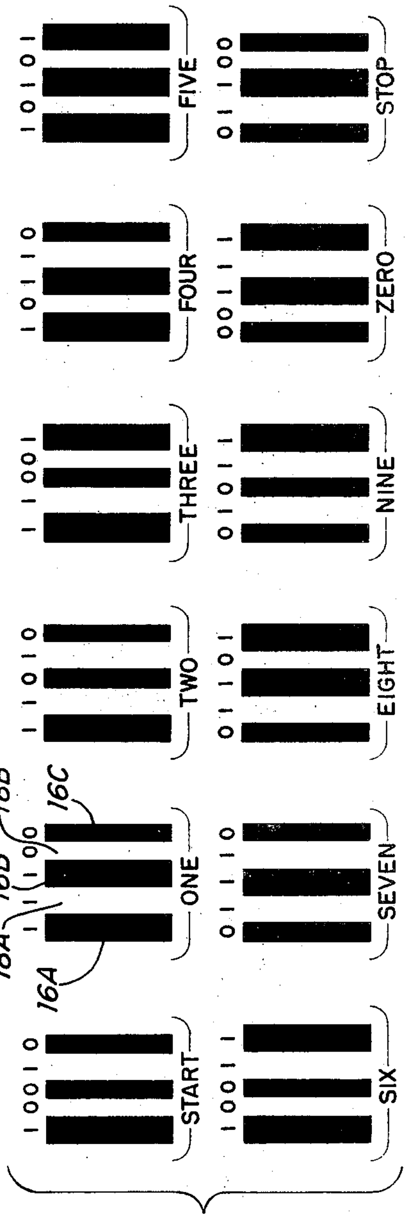
FIG. 2 is a schematic illustration of one set of codes for the digits "1–9", "0", start, and stop.

The code used in preparing the record 12 can be one of those known in the art, and FIG. 2 of the drawings illustrates one set of codes useful in carrying out the present invention. The illustrated code is a five bit code including parity check bit and four data bits. These five bits are defined by three bars or areas 16A, 16B, and 16C of one characteristic and two intervening bars or spaces 18A and 18B of a different characteristic. In a preferred embodiment, the bars 16A–16C are formed by printing a substantially nonreflective material, such as black ink, on the reflective surface of the record 12 so that the areas, bars, or spaces 18A and 18B comprise the light reflective surface of the record. The different characteristics of the bars 16A–16C and 18A and 18B could also be defined by the use of different materials, such as the presence or absence of magnetic material or materials of sufficiently different light reflecting characteristics.

The encoding technique used in the code illustrated in FIG. 2 is to assign a wide width to the bars 16, 18 to represent a binary "1" and to assign a narrow width to the bar or area 16, 18 to represent a binary "0". The relative sizes and the wide and narrow width should be optimized to insure adequate differentiation on interpretation, and in general this is accomplished by maximizing the difference between the wide and narrow widths within the constraints that the narrow bar must be large enough to insure a proper width value entry on interpretation, and the wide width must not be so large as to provide an overflowed condition on entering a width value. Another factor to be considered is that an increase in the differentiation between widths generally results in an accompanying loss of bit density or packing on the record, while a reduction in width difference can be used to increase bit density. In one embodiment of the present invention, the narrow width representing a binary "0" was selected to be 0.008 inches, while the wide width was set at 0.020 inches, nominal.

A further factor to be considered with regard to the selection of widths for the bars is the printing tolerances which must be maintained to insure accurate record interpretation. Using the values set forth above, accurate differentiation can be obtained with width tolerances of +0.003 inches and −0.002 inches when the speed of relative movement between the record 12 and the reader 14 varies between three and thirty inches per second when using the interpreting system 10 and method of the present invention.

To illustrate the width coding used with the system 10, the code assigned to the numerical character one (FIG. 2) is "11100". Considered from left to right, these binary bits represent a parity check character and the binary weights "8", "4", "2", and "1", respectively. The binary value "1" in the first three bit positions is denoted by the wide width assigned to the bar 16A, the space or white bar 18A, and the bar 16B. The binary value "0" in the last two bit positions is represented by the narrow width assigned to the white bar or space 18B and the black bar 16C. The codes illustrated in FIG. 2 include in addition to the codes for the digits "1–9" and "0", a start and stop code. On the record 12, the message is preceded by a start code and followed by a stop code. When the codes shown in FIG. 2 are read in forward or reverse direction, the binary significance of the bars and spaces is unchanged, but the order of presentation of the character code is reversed. Further, the codes assigned for start and stop are distinct when read in forward or reverse direction to enable unambiguous detection or decoding by the system 10.

Referring now more specifically to the simplified block diagram in FIG. 1, relative movement is produced between the record 12 and the reader 14, as by manually moving the reader 14 across a line such that it intercepts each segment or bar of the encoded message. The reader 14 can be of any suitable type known in the art and generally includes a light source for illuminating the record 12 and a photoresponsive means whose output varies in accordance with reflected light received from the record 12. The output of the reader 14 is coupled to an analog-to-digital converter 20 of known construction, the output of which changes between high and low levels on transitions between the black and white bars on the record 12 and the durations of which are proportional to the elapsed time between white and black transitions. Thus, the apparent width of any bar or space as represented by the duration of the high or low level signal at the output of the unit 20 will vary in dependence on the relative speed of movement between the record 12 and the reader 14, or variations therein. The output of the analog-to-digital unit 20 is supplied to a control circuit 22 and to an input of a gating means 24, the other input use in is coupled to a free running clock 26.

The gate means 24 is shown in simplified form as a single gate but in effect and function couples pulses from the clock pulse source 26 to its output whenever the reader 14 is in use in reading a record 12. The output of the gate means 24 is coupled to the input of an input steering circuit 28 and to the input of a divide-by-5 counter 30. In the normal setting of the circuit 10, the control circuit 22 controls the input steering circuit 28 to couple the output of the gate 24 to a first bar or bar one register 32. The output of the divide-by-5 counter 30 is coupled to the input of a reference or comparison register 34.

Accordingly, when the system 10 is placed in operation, the A/D unit 20 enables the gate 24 so that clock pulses from the source 26 pass through the gate 24 and the input steering circuit 28 to advance the register 32. These pulses from the output of the gate means 24 are also supplied through the counter 30 to advance the reference or comparison register 34. On the transition from black to white at the end of the first black bar, the control circuit 22 controls the input steering circuit 28 to disable the first bar register 32 and to enable a first space register 36. At this time, the first bar register 32 is standing at a value proportional to the width of the first scanned black bar on the record 12, and the reference or comparison register 34 is standing at one-fifth of the value standing in the register 32.

During the scanning of the first white bar or space, the first space register 36 is advanced by the pulses from the clock pulse source 26, and the reference register 34 is further advanced at one-fifth the rate of the advance of the register 36. When the reader 14 reaches the end of the first space and enters the second black bar, the control circuit 22 again controls the input steering circuit 28 to inhibit the input to the first space register 36 and to enable a second bar register (not shown). At this time, the first space register 36 stores a value proportional to the width of the first space, and the reference register 34 stands at the value equal to one-fifth of the total width value stored in the first bar register 32 and the first space register 36.

During the following relative movement between the record 12 and the reader 14, the values of the second black bar and the second white bar or space are stored in registers (not shown) similar to the registers 32 and 36 under the control of the input steering circuit 28, and the value standing in the reference register 34 is increased in an amount equal to one-fifth of the values added to these two registers. The reader 14 then enters the third or last bar in the five bit character code, and the value of the width of this last bar is stored in the third bar or bar three register 38, while one-fifth of this value is added to the reference register 34. At the end of the scanning of the third bar, the control circuit 22 disables the input to the third bar register 38 and controls an output steering circuit 40 to couple the first bar width value stored in the register 32 to the input of a comparator 42. The other input to the comparator 42 is provided by the reference register 34. At this time, the value standing in the reference or comparison register 34 is one-fifth of the total value stored in the five registers including the registers 32, 36, and 38. Since there are five of these registers, and the count standing in the register 34 is the total number of pulses supplied to the width registers divided by five, the register 34 stores the average width of the bars and spaces in the first character code read. Thus, this value provides a virtual reference against which the actual measured widths can be measured to determine the "1" or "0" significance of the bar or space widths. Accordingly, if the value of the bar width stored in the register 32 exceeds the average width or virtual reference width stored in the register 34, the comparator provides a signal representing a binary "1". Alternatively, if the value of the width of the first bar stored in the register 32 is less than the virtual reference value stored in the register 34, the output of the comparator 42 supplies a signal representing a binary "0". This binary bit value signal derived from the output of the comparator 42 is clocked into a character register 44 under the control of the control circuit 22.

As this first decoded bit is transferred into the character register 44, which can comprise a shift register, the control circuit 22 controls the output steering circuit 40 to disable the output of the register 32 and to supply the value stored in the first space register 36 to the comparator 42 for comparison with the virtual reference stored in the register 34. The relation of the value stored in the register 36 to the virtual reference stored in the register 34 is now determined by the comparator 42, and a binary "0" or "1" is shifted into the character register 44 under the control of the control circuit 22. This operation is repeated for the remaining three bits of the code so that the five bits of the first character are stored in the character register 44.

Since the start of any message on the record 12 requires a start code read in a forward direction or a stop code read in a reverse direction, a control decoder 46 continuously monitors the characters stored in the register 44 to detect the presence of one of these two codes indicating the beginning of a message. When such a code is detected by the control decoder 46, the control circuit 22 is converted from a scanning mode in which it looks for a correct start to a reading mode in which the contents of the character register 44 are transferred through a data decoder 48 to the input of a plural character message register 50 under the control of the control circuit 22.

During continuing relative movement between the reader 14 and the record 12, the reference register 34 is cleared at the end of the receipt of each character. The width registers, such as the registers 32, 36, and 38, are cleared, and the input and output steering circuits 28 and 40 are operated in the manner described above to store bar and space width values in the width registers and to establish a virtual reference value in the register 34. These values are then compared in the comparator 42, and the binary bits of each character are transferred to the character register 44, decoded in the data decoder 48, and transferred to the message register 50 for utilization in an output device 52, such as a lamp display or computer peripheral unit. When a complete message has been read from the record 12, the control decoder 46 detects a proper stop code in the character register 44, either a start code read in reverse or a stop code read forward, and controls the control circuit 22 to convert the system 10 from a reading mode back to a scan mode in which the system 10 searches for the next proper start code. The message register 50 and the output device 52 can be cleared either at the conclusion of the message or upon utilization of the reproduced data.

Figure 3:
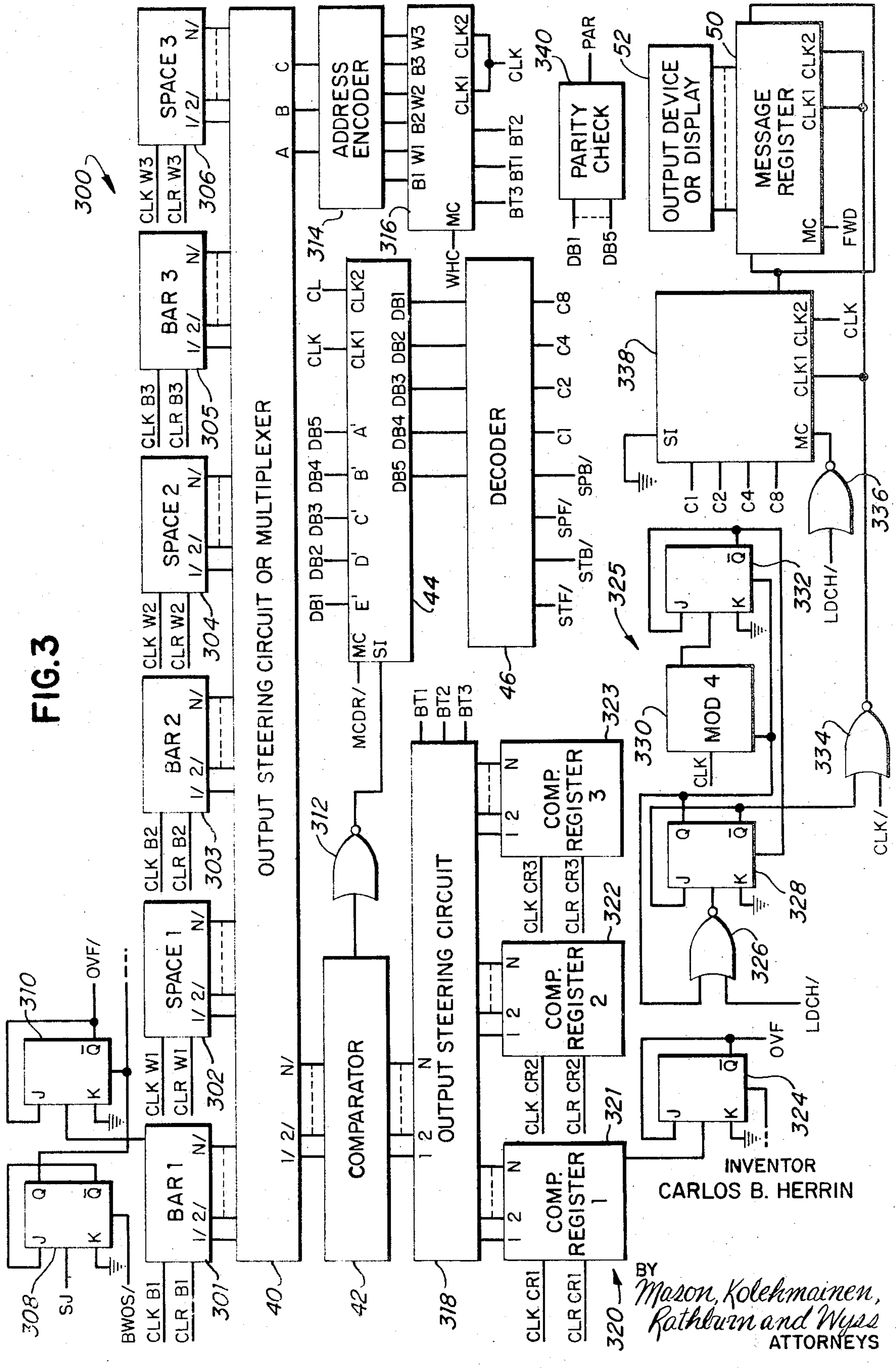
FIG. 3 is a schematic diagram in logic block form illustrating the basic data flow in a record translating system embodying the present invention.
Figure 4:
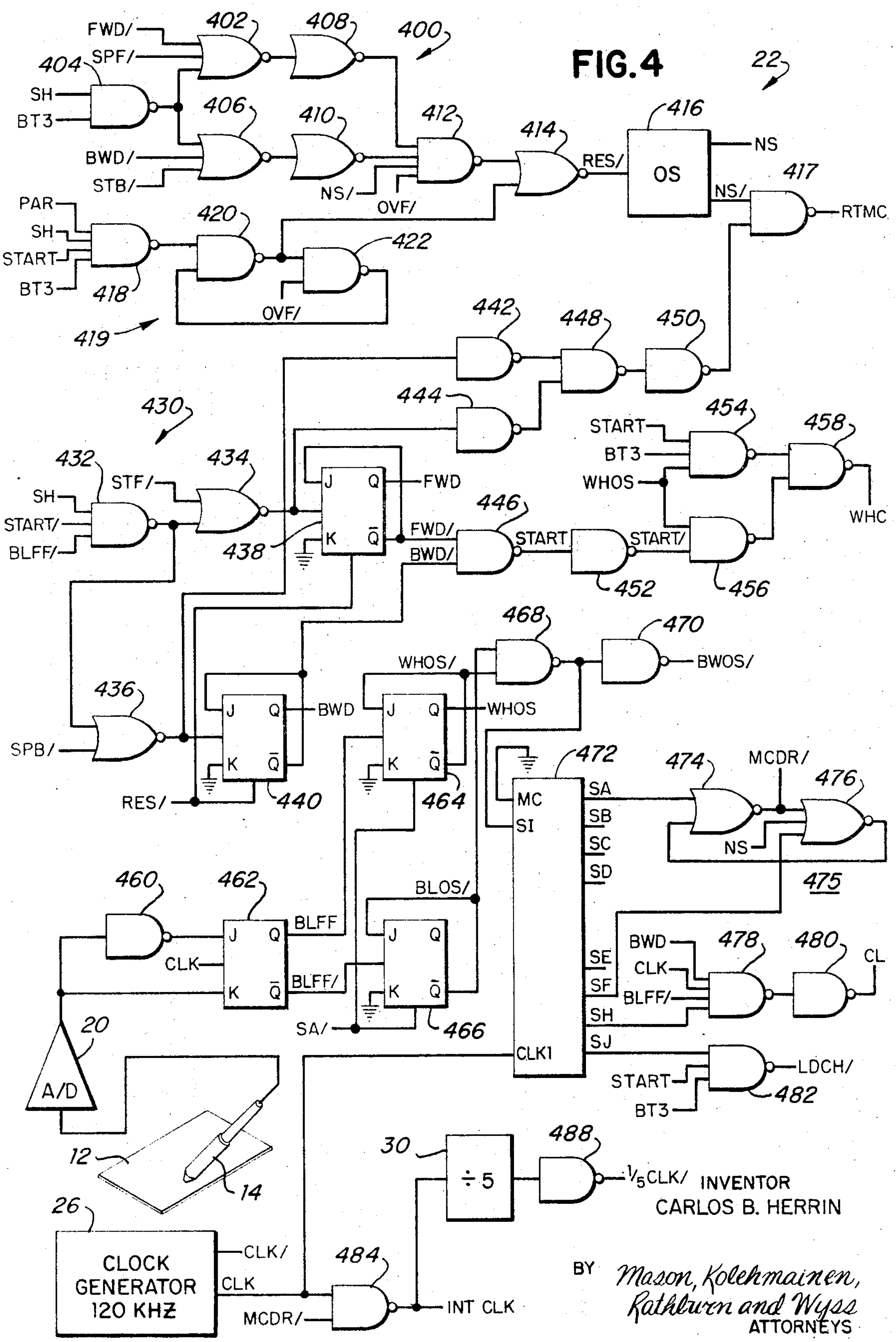
FIG. 4 is a logic block diagram of control circuits included in the record translating system of the present invention providing basic control and error signals.
Figure 5:
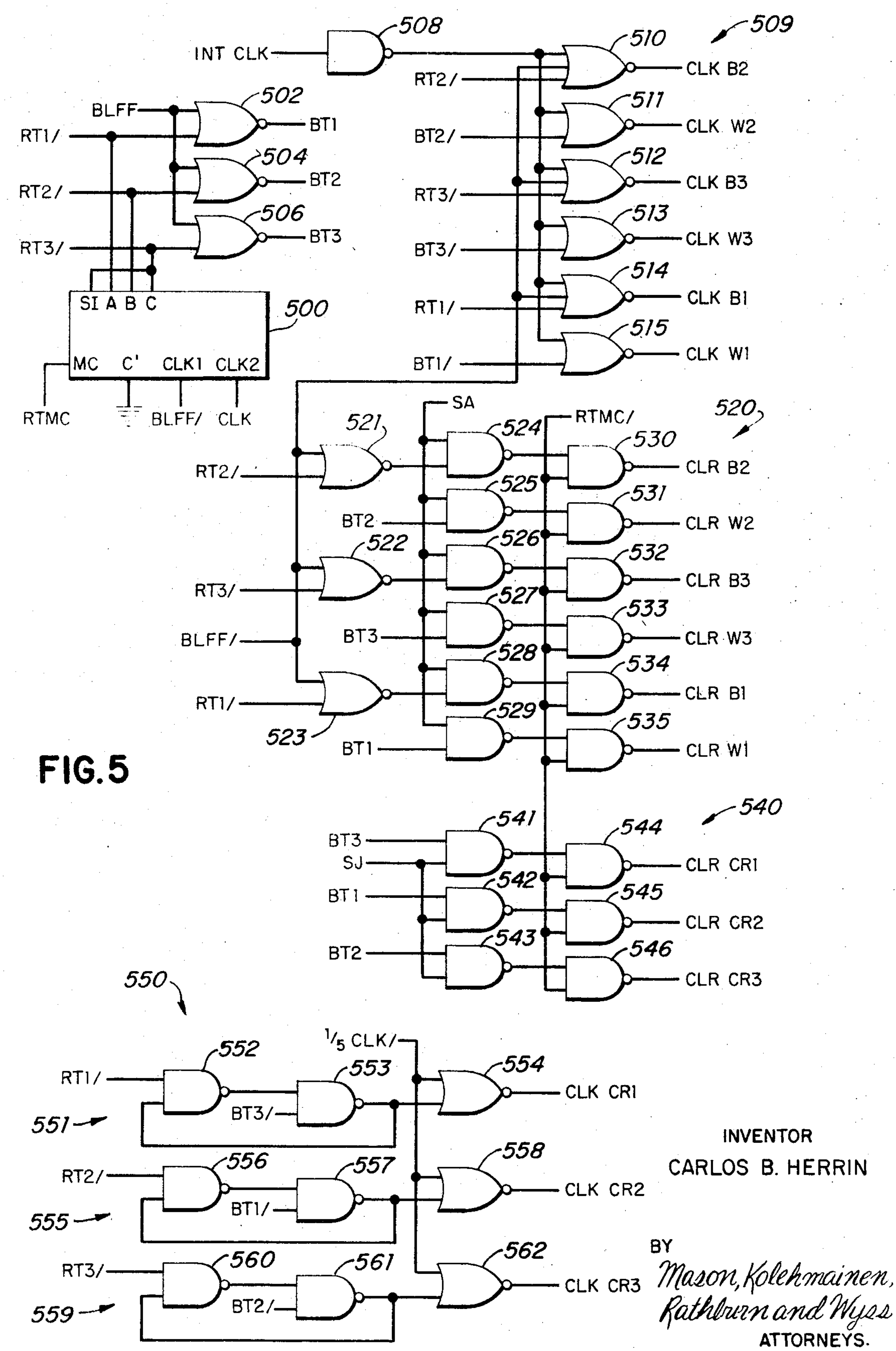
FIG. 5 is a logic block diagram illustrating timing circuits provided in the record translating circuit.

The record interpreting system 10 is illustrated in detail in logic block form in FIGS. 3–5 of the drawings using NAND and NOR logic. Although the components can be of any suitable type, an embodiment of the system 10 has been constructed using series 54/74 TTL logic elements manufactured and sold by Texas Instruments, Incorporated of Dallas, Texas. The logic of the system 10 can, however, be implemented using other known forms of logic elements.

Referring now more specifically to FIG. 4 of the drawings, therein is illustrated a substantial portion of the control circuit 22 for providing various signals for controlling the operation of the system 10 and for providing a portion of the timing signals. More specifically, the clock generator 26 provides the basic timing signal or clock signal CLK for the system. Throughout the drawings and the description, an inverted signal is indicated by a "/" following the signal designation. In many instances, the additional inverter required for signal inversion is not illustrated. Thus, the inverted clock signal is shown on FIG. 4 and other places in the drawings as "CLK/". The clock signals CLK and CLK/ are used at various points in the system 10 to synchronize operation. It is desirable to interrupt certain of the operations controlled or synchronized by the clock during various times such as a period during which a received bit is being compared in the comparator 42 or transferred into the character register 44. Thus, the clock signal CLK is supplied to one input of a NAND gate 484, the other input of which is provided with a signal MCDR/. This latter signal drops to a low level on each black/white or white/black transition and remains at a low level for a period of time sufficient to complete a character comparison. Accordingly, the signal MCDR/ inhibits the gate 484 during this time interval. When this signal is not present, a signal INT CLK is provided with the same timing as the clock signal CLK but inverted in level.

The output of the gate 484 also drives the divide-by-5 counter 30, the output of which is coupled through a gate 488 to provide a signal 1/5 CLK/. Thus, the comparison or reference registers such as the register 34 cannot be advanced during character comparison.

Figure 7:
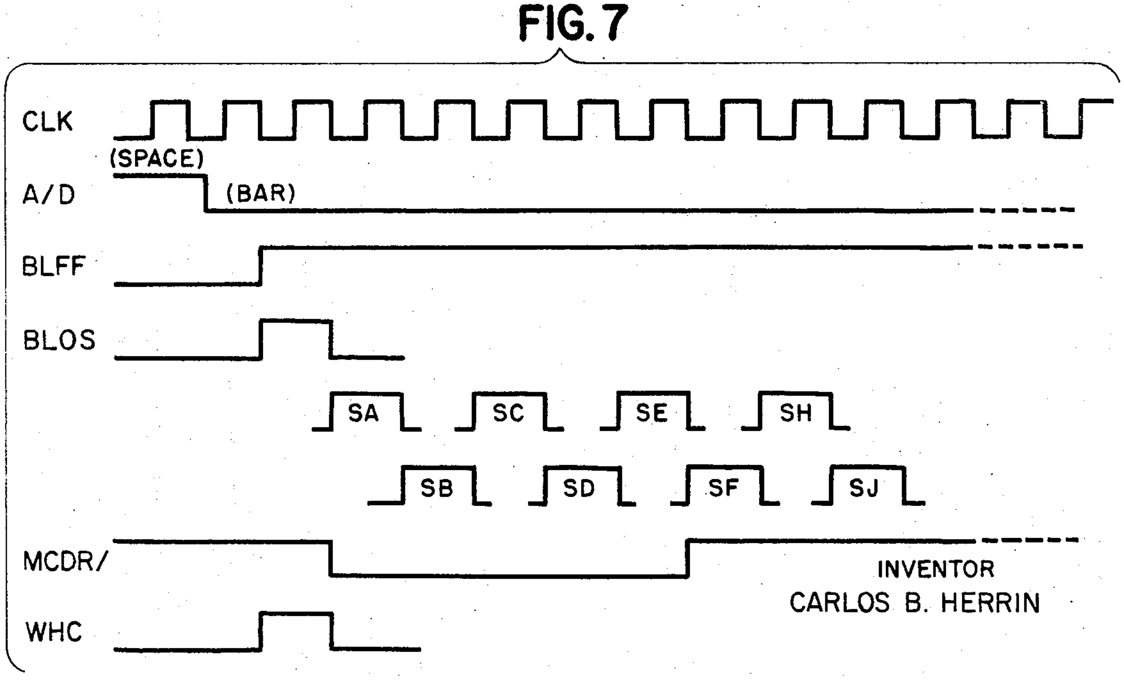
FIG. 7 illustrates, on a different time scale, certain timing and control signals used in the record reading system.

To provide means for detecting level changes in the output of the analog-to-digital unit 20 representing transitions between bars and spaces or spaces and bars, the output of this unit is coupled directly or through a gate 460 to the indicated terminals of a JK flip-flop 462, the clock terminal of which is supplied with the signal CLK. Accordingly, whenever the reader 14 encounters a bar, the output of the unit 20 drops to a low level, and the trailing edge of the following clock signal CLK sets the flip-flop 462 to provide a more positive signal BLFF and a low level signal BLFF/ (see FIG. 7). As the signal BLFF/ drops to a low level, a flip-flop 466 is clocked to provide a more negative signal BLOS/ which is applied to one input of a NAND gate 468.

When the reader 12 enters a white bar or space, the output of the unit 20 rises to a high level, and the trailing edge of the next clock signal CLK resets the flip-flop 462 so that the signal BLFF drops to a low level, and the inverted signal BLFF/ rises to a more positive level. The trailing edge of the signal BLFF clocks a flip-flop 464 to provide a more positive signal WHOS and a more negative signal WHOS/, the latter signal being supplied to the other input of the gate 468. Accordingly, the output of the gate 468 is driven to a more positive level on a transition from either black to white or white to black. This signal is forwarded through a gate 470 to provide a negative-going signal BWOS/ on each of these transitions.

The output of the gate 468 is used to control a shift register 472 to generate a series of timing signals SA-SH and SJ used for character comparison and other control functions on each record transition. The shift register 472 is of a conventional construction and includes a serial input terminal SI to which the output of the gate 468 is connected and a mode control terminal MC which, when connected to ground or a low level potential, conditions the shift register 472 to right-shift a signal provided at the serial input through the various stages of the shift register on the trailing edge of a clock signal applied to a clock input terminal CLK1. The illustrated shift register 472 includes eight stages for generating the output signals SA–SH and SJ.

Figure 6:
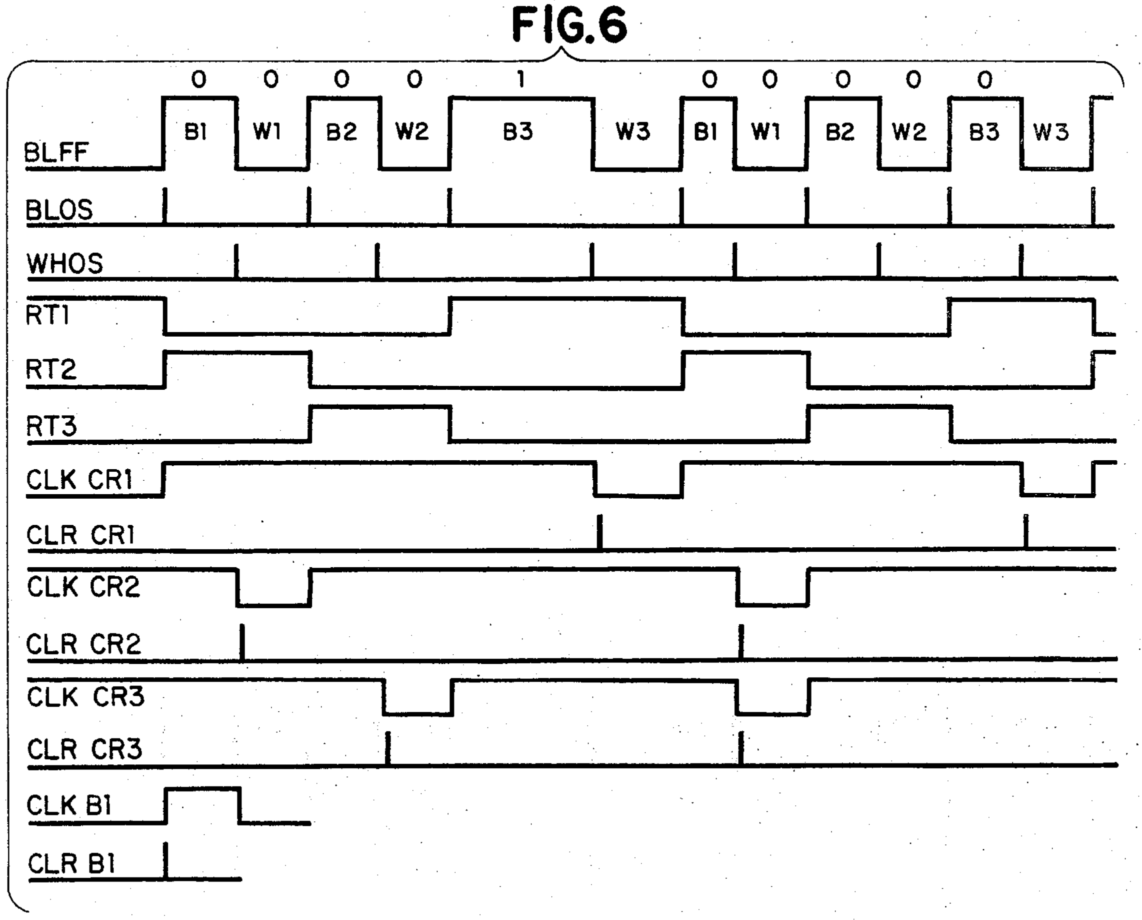
FIG. 6 illustrates, on one item scale, certain timing and control signals used in the record reading circuit of the present invention.

More specifically, when the output of the gate 468 rises to a more positive potential as a result of either of the signals BLOS/ or WHOS/, the trailing edge of the following clock signal CLK stores a "1" in the first stage of the shift register 472 and provides a more positive signal SA. The inverted signal SA/ is applied to the clear or reset terminals of the flip-flops 464 and 466 and resets the one of these two flip-flops that was previously set by the transition (see FIG. 6). The signal SA also sets a latch 475 including a pair of cross-coupled NOR gates 474 and 476 so that the signal MCDR/ drops to a low level to inhibit the gate 484 as described above. During succeeding clock signals CLK, the binary "1" in the shift register 472 is shifted through the various stages to generate more positive signal SB, SC, SD, SE, and SF (see FIG. 7). The signal SF resets the latch 475 by driving the output of the NOR gate 476 to a low level and thus places the signal MCDR/ at a more positive level to remove the inhibit from the gate 484. Thus, the shift register 472 provides a five clock pulse inhibit through the signal MCDR/.

On the trailing edge of the next two clock pulses, the more positive signals SH and SJ are generated. The next clock pulse clears the shift register 472 until such time as the next transition in the output of the unit 20 occurs (see FIG. 7).

Referring now more specifically to FIG. 3 of the drawings, therein are illustrated the major functional components of the system 10. The system includes width registers 300 consisting of six counting registers 301–306 for storing representations of the widths of the three bars and two spaces in the five bit code and also the space following the third black bar. More specifically, the registers 301, 303, and 305 are provided for storing representations of the three bars, and the registers 302, 304, and 306 are provided for storing representations of the widths of the two spaces or white bars and the white space following the third black bar, respectively. The third space register 306 is used only during the scan mode of the system 10 when a search is being made for a valid start condition. in FIG. 3, the registers 301, 302, and 305 correspond generally in function to the registers 32, 36, and 38 in FIG. 1.

The system 10 also includes comparison or reference register means 320 including three counting registers 321–323 identified as comparison registers one, two and hree. These three registers are used during the scan mode of the system 10, and only the first comparison register 321 which corresponds in function to the reference register 34 of FIG. 1 is used during the read mode in which intelligence is transferred from the character register 44 to the message register 50. All of the counting registers 301–306 and 321–323 are conventional binary counters having available both direct and inverted outputs and counting and clearing or resetting inputs.

Referring now more specifically to FIG. 5 of the drawings, therein are illustrated various circuits for controlling counting into, the clearing, and the addressing or steering of the outputs from the register means 300 and 320. The basic timing circuit shown in FIG. 5 is a right-left shift register 500 of known construction having the usual serial input terminal SI, a mode control input terminal MC, shift register stage output terminals A, B, and C, corresponding parallel input terminals of which only one C′ is shown, a serial clock input terminal CLK1, and a parallel input clock terminal CLK2. The parallel input terminal C′ for the third stage of the shift register 500 is strapped to ground or a low level potential.

When the system 10 is reset or retimed, a signal RTMC coupled to the terminal MC becomes more positive so that the shift register 500 reads into the shift register stages the input from the parallel input terminals on the trailing edge of the next clock signal CLK coupled to the parallel input clock terminal CLK2. Since the parallel input terminal C′ is strapped to ground and the remaining input terminals are floating or high, the trailing edge of the first clock signal CLK following the more positive signal RTMC sets binary "1"s in the first two stages so that the outputs from the terminals A and B become more positive, and the output from the terminal C becomes low to provide the timing signal RT3/. When the signal RTMC drops to a low level, the application of this potential to the mode control terminal MC conditions the shift register 500 for serial shift to the right on the trailing edge of signal BLFF/ which goes negative as set forth above each time the reader 14 enters a black bar. Since the output terminal C is strapped directly to the serial input at terminal SI, the first black bar encountered by the reader 14 following the resetting of the system 10 shifts the low level signal from the terminal C to the output terminal A, and the signal RT1/ drops to a low level while the signals RT2/ and RT3/ are at a more positive level by virtue of shifting the binary "1" previously stored in the first and second stages of the register 500 to the second and third stages thereof (see FIG. 6). Each negative-going transition in the signal BLFF/ shifts the low level or binary "0" signal one step to the right in the shift register 500 so that the signals RT1/–RT3/ drop to a low level in sequence as the reader 14 enters each black bar 16. More specifically, the signal RT1/ becomes low on the leading edge of each bar 16A (FIG. 2), the signal RT2/ becomes more negative on the leading edge of the bar 16B, and the signal RT3/ becomes more negative on the leading edge of the bar 16C.

The signals RT1/–RT3/ are also applied to one input of three NOR gates 502, 504, and 506, the other inputs of which are coupled in common to a lead supplied with a signal BLFF. This signal is positive whenever the reader 14 is in a black area and drops to a low level whenever the reader 14 enters a white area or space. Accordingly, the gates 502, 504, and 506 develop positive output signals as the white spaces following the black bars 16A, 16B, and 16C, respectively, are entered. The signals RT1/–RT3/ and BT1–BT3 are used to synchronize and control the clearing, operation, and selection of the register means 300 and 320.

More specifically, a gate means 520 including the gates 521–535 is used to generate six signals CLR W1 – CLR W3 and CLR B1 – CLR B3 for clearing or resetting the registers 301–306 in which are stored the widths of the bars and spaces of the code. The output gates 530–535 are supplied with the signal RTMC/ which goes low when the shift register 500 is being reset so as to supply all six signals CLR B1–W3. The other inputs to the gates 530–535 are coupled to the outputs of the six NAND gates 524–529. These six gates are enabled by the signal SA which rises to a positive level at the beginning of the series of pulses generated as described above on each transition in the level of the unit 20. The other inputs to the gates 525, 527, and 529 for generating signals for clearing the space registers are supplied by the signals BT2, BT3, and BT1, respectively. The other inputs to the gates 524, 526, and 528 for clearing the bar registers are coupled to the outputs of three NOR gates 521-523. These NOR gates are enabled by the signal BLFF/ with their other inputs being supplied by the signals RT2/, RT3/, and RT1/, respectively.

Accordingly, when the first bar is reached by the reader 14, the signals BLFF/ and RT1/ drop to a low level to place both inputs to the NOR gate 523 at a low level, and its output rises to a more positive potential. The signal SA completes the enabling of the gate 528 so that its output drops to a low level and is effective through the gate 534 to produce a positive-going signal of the duration of the signal SA. This provides the signal CLR B1 used for resetting the first bar register 301. When the first space or white bar is reached, the signal BLFF/ rises to a more positive level to inhibit the gate 523, and the signal BT1 becomes more positive. Thus, the signal SA appearing following this transition completes the enabling of the gate 529, and the gate 535 generates a positive-going signal CLR W1 which is used to clear the first white register 302. In a similar manner, the remainder of the width register clearing signals CLR B2, CLR W2, CLR B3, and CLR W3 are generated in sequence during each cycle of the shift register 500.

A group of gates or circuit 509 is provided for generating six signals CLK B1 – CLK B3 and CLK W1 – CLK W3 for operating the counters 301–306 to settings representing the widths of the bars and spaces under the control of the reader 14. The circuit 509 includes six NOR gates 510–515 each having one input coupled to the output of a gate 508 whose input is supplied with the signal INT CLK. This interrupted clock signal follows the clock signal CLK except for the period in which it is inhibited to prevent advance of any of the counters 301–306 during a comparison operation. The three gates 511, 513, and 515 for advancing the space width counter are two input gates whose other inputs are supplied by the signals BT2/, BT3/, and BT1/, respectively. The gates 510, 512, and 514 for supplying the signals for operating the bar width counters are three input gates commonly enabled by the signal BLFF/ and individually controlled by the signals RT2/, RT3/, and RT1/, respectively.

Accordingly, when the reader 14 enters the first bar, the signal BLFF/ drops to a low level to partially enable the three gates 510, 512, and 514. As described above, the signal RT1/ also drops to a low level and thus places the second input to the gate 514 at a low level. After the delay period described above, the signal INT CLK follows the clock signal CLK, and the output of the gate 514 follows the clock signal CLK 180° out of phase. This pulse train which is used to advance the first bar counter 301 continues until such time as the reader 14 leaves the first black bar. At this time, the signal BLFF/ rises to a more positive level to apply an inhibit to the gate 514. Thus, the duration of the train of signals CLK B1 is proportional to the width or duration of the first black bar.

When the signal BLFF/ rises to a high level, the signal BT3/ drops to a low level to enable the gate 515. Thus, the output of this gate after the delay period is controlled by the signal INT CLK to develop a train of signals or pulses CLK W1 for advancing the white counter. This train of pulses is interrupted when the reader 14 enters the second black bar so that the duration of the train of signals CLK W1 is proportional to the width of the first white bar or space. In a similar manner, the gates 510–513 develop the signals CLK B2, CLK W2, CLK B3, and CLK W3.

A circuit 540 is provided for developing three signals CLR CR1 – CLR CR3 (see FIG. 6) for clearing the comparison or reference counters or registers 321–323. The circuit 540 includes three NAND gates 544–546 having one input supplied with the signal RTMC/ so that these gates supply the signals CLR CR1–CR3 when the timing of the shift register 500 is being reset. The other inputs to the gates 544–546 are coupled to the output of three NAND gates 541–543, respectively. One input to each of these gates is enabled by the signal SJ which occurs at the end of the delay interval occurring on each transition, and the individual remaining inputs to these three gates are controlled by the signals BT3, BT1, and BT2, respectively.

Accordingly, when the reader 14 enters each white space following a code, i.e., the third white space, the signal BT3 becomes more positive, and the output of the gate 541 drops to a low level during the interval of the signal SJ. Since the other input to the gate 544 is held at a more positive potential, the output of the gate 544 is controlled by the gate 541 to provide a positive-going signal CLR CR1 of one clock pulse duration in the space preceding each first black bar in the code. This signal CLR CR1 is used to clear the first comparison register or counter 321. In a similar fashion, the signals BT1 and BT2 develop the signals CLR CR2 and CLR CR3 in the spaces preceding the second and third black bars in the code.

A circuit 550 is provided for developing three signals CLK CR1 – CLK CR3 (see FIG. 6) for advancing the comparison registers 321–323, respectively, to settings representing the virtual reference or average value of the bars and spaces read into the width counters 301–306. The circuit 550 includes three latches 551, 555, and 559 for controlling three output NOR gates 554, 558, and 562, one input of each of which is supplied with the signal 1/5 CLK/ occurring at one-fifth the normal clock rate. When the reader 14 enters the first black bar, the signal RT1/ drops to a low level and is effective through a gate 552 to apply a more positive potential to one input of a gate 553 whose output is cross-connected to the other input of the gate 552. The other input of the gate 553 is supplied with the signal BT3/ which is at a positive level because the reader has left the third white space. Thus, the output of the gate 553 drops to a low level to latch the circuit 551 and to apply a more negative signal to the other input of the NOR gate 554. So long as the latch 551 remains set, the signal 1/5 CLK/ is supplied through the gate 554 to provide the signal CLK CR1. The latch 551 is reset when the reader 14 enters the third white space so that the signal BT3/ drops to a low level. This drives the output of the gate 553 to a more positive level, disables the gate 554, and places the output of the gate 552 at a low level until the reader 14 again enters the first black bar so that the signal RT1/ drops to a low level. Accordingly, the signal CLK CR1 consists of one of five clock pulses applied to the width counters 301–306 in the interval between the leading edge of the first black bar and the trailing edge of the third black bar.

In a similar fashion, the latches 555 and 559 including the cross-connected NAND gates 556, 557, and 560, 561 develop the signals CLK CR2 and CLK CR3 for advancing the second and third comparison registers 322 and 323 with one fifth of the total number of pulses applied to the width counters 301–306 in the intervals bounded by the leading edge of the second black bar and the trailing edge of the first black bar, and the leading edge of the third black bar and the trailing edge of the second black bar, respectively. As noted above, the signals CLK CR2 and CLK CR3 together with their related comparison registers 322 and 323 are used only in the scan mode of the system 10.

Referring now more specifically to the operation of the system 10, the reader 14 is placed adjacent the record 12 and moved toward the first black bar in the message which should comprise the first black bar of the start code shown in FIG. 2. As the first black bar is entered by the reader 14, the flip-flop 462 (FIG. 4) is set to cause the setting of the flip-flop 466 in the manner described above. This starts a cycle of the shift register 472 during which the signals SA–SH and SJ are developed. Further, assuming that the signal BT3 has just disappeared and that the signal RT1/ is now present, the circuit 540 has developed the signal CLR CR1 to clear the first comparison register 321 (FIG. 3), and the latch 551 in the circuit 550 has been set so that after the disappearance of the signal SJ, the signal CLK CR1 appears to start the advance of the first comparison register 321. Further, the circuit 520 has cleared the first bar register 301 with the signal CLR B1, and the circuit 509 provides the signal CLK B1 to advance the first bar counter 301 (FIG. 3). As the reader 14 reaches the end of the first black bar in the start code which is shown in FIG. 2 as a wide bar, the generation of the signal CLK B1 is terminated, with the value of the width of the first black bar in the start code stored in the first bar register 301. The first comparison register 321 has stored therein one-fifth of the total value stored in the register 301. At this time, the circuit 520 generates a signal CLR W1 to clear the first space register 302, and the circuit 509 as the reader 14 enters the first space develops the signal CLK W1 to start the advance of the first space width counter 302. The signals applied to the first space width counter 302 divided by five are applied to the first comparison register 321 to further advance this counter. As shown in FIG. 2, the first space in the start code has a narrow width. Further, when the reader 14 is in the first space or white bar, the circuit 540 generates the signal CLR CR2 to clear the second comparison register 322.

The reader 14 now enters the second black bar which is a narrow bar. At this time, the circuit 520 provides the signal CLR B2 to clear the second bar register 303 and starts the train of signals CLK B2 to determine and store the width of the second bar in the register 303. This value is also added, divided by five, into the first comparison register 321. In addition, the latch 555 in the circuit 550 has been set to develop the signal CLK CR2 so that the value of the second black bar divided by five is added into the second comparison register 322. Thus, as the reader 14 reaches the end of the second black bar, the value of the first black bar, the first space, and the second black bar are stored in the registers 301–303, respectively. One-fifth of the total value standing in these three registers is stored in the first comparison register 321, and one-fifth of the value in the second bar register 303 is standing in the second comparison register 322.

As the second space is traversed by the reader 14, its value is stored in the second space register 304, and one-fifth of its value is stored in the first comparison register 321 and also in the second comparison register 322. In addition, the third comparison register 323 is cleared. This is accomplished under the control of the signals CLK W2, CLK CR1, CLK CR2, and CLR CR3. As shown in FIG. 2, the width of the second white bar or space is wide representing a binary "1".

The reader 14 then enters the third bar of the start code which is a narrow black bar. The value of this third bar width is stored in the third bar width register 305, one-fifth of its value is added to the first comparison register 321 and the second comparison register 322. In addition, one-fifth of the value of this third black bar is entered into the third comparison register 323. This is accomplished under the control of the signals CLK B3, CLK CR1, CLK CR2, and CLK CR3.

Since a complete start code consists of five bits and the first five width registers 301–305 are now loaded, the transition into the white space following the third black bar provides the first valid opportunity to detect a proper start code. It should be noted that the system 10 is so arranged that attempts have been made to detect valid start codes as the information is stored in the counters 301–305 in the manner described above, but a description of these operations is omitted because it could not result in the detection of a valid start. In general, a valid start code is detected by using a shift register 316 (FIG. 3) to control an address encoder 314 so that the output steering circuit or multiplexer 40 presents the widths stored in the registers 301–306 in proper sequence to the comparator 42 for comparison with, in sequence, the average or virtual reference value stored in the proper one of the comparison registers 321–323, the latter being selected by an output steering circuit 318.

In the assumed example in which the reader 14 first encounters the first black bar of the start code, a correct start code is stored in the registers 301–305 when the reader leaves the third bar of the start code, and a true virtual reference or average width is stored in the first comparison register 321, the second and third comparison registers 322 and 323 being only partially loaded at this time. When the reader 14 enters the white space following the third black bar, the signal WHOS (FIG. 4) rises to a high level and is effective through a gate 456 whose other input is supplied with a more positive signal START/ to apply a more negative input to one input of a gate 458, whose other input is held at a more positive potential by a gate 454. Thus, the output of the gate 458 provides a brief positive-going pulse or signal WHC. The signal WHC is supplied to the mode control terminal MC of the shift register 316 (FIG. 3) so that this terminal is momentarily held at a more positive potential. During the clock pulse applied to the parallel input clock terminal CLK2 by the signal CLK, the parallel inputs which are supplied with the signals BT1-BT3 are read into the shift register 316. Since the reader 14 is now entering the third space or the white space following the start code, the signal BT3 is positive, and the shift register 316 is primed to a condition in which an output signal B1 is at a more positive potential. This controls the address encoder 314 to supply a combination of three input signals A, B, and C to the three inputs of the output steering circuit 40 to select the outputs of the first bar register 301 for connection to one set of inputs to the comparator 42. As shown in FIG. 3, the inverted outputs of the register 301 are coupled through the multiplexer 40 to the inputs of the comparator 42.

The signals BT1–BT3 are also used for addressing the output steering circuit 318. Since the signal BT3 is at a more positive level, the output steering circuit 318 selects the true outputs of the first comparison register 321 for coupling to the second set of inputs to the comparator 42. This comparator can comprise, for example, a conventional half-adder, and when supplied with inverted outputs from the width registers 301–306 and true outputs from the comparison registers 321–323 through the steering circuits 40 and 318, respectively, provides a more negative or low level output to the input of a NOR gate 312 when the value standing in a width register 301–306 is greater than the value standing in a comparison register 321–323. When the stored width exceeds the virtual reference, a binary "1" is established, and the low level signal supplied to the NOR gate 312 provides a more positive input to the serial input terminal SI of the character shift register 44. On the other hand, when the value standing in one of the comparison registers 321–323 exceeds the value stored in one of the width registers 301–306, the output from the comparator 42 is at a high level which is inverted by the NOR gate 312 to provide a low level input to the serial input terminal SI of the character shift register 44.

Since, in the assumed example of the correct reception of a start code, the width of the first bar 16A of the start code is wide, the value stored in the selected first bar register 301 exceeds the average value stored in the first comparison register 321, and the output of the comparator 42 applies a more positive signal to the serial input terminal SI of the character shift register 44. Since the signal MCDR/ is at a low level because the reader has just entered the white space following the third black bar 16C in the start code, the clock signal CLK applied to the serial clock terminal CLK1 of the shift register 44 shifts a more positive signal representing a binary "1" into the first stage of the register 44 to load the first translated bit of the start code into this register.

The clock signal CLK is also applied to the serial or shift clock terminal CLK1 of the addressing shift register 316. Since the signal WHC is now at a low level, the clock signal CLK shifts the "1" previously entered into the first stage into the second stage so that an output signal W1 representing the first space register 302 becomes high to control the address encoder 314 so that its output signals A, B, and C address the output steering circuit 40 to couple the inverted outputs of the first space register 302 to the input of the comparator 42. Since the width of the first space in the start code (FIG. 2) is narrow, the value standing in the register 302 is less than average value standing in the first comparison register 321, and the comparator 42 applies a low level input to the serial input terminal SI. Thus, on the clock pulse CLK, a binary "0" is shifted into the first stage of the register 44, and he binary "1" previously entered is shifted into the second stage.

This operation continues for the next three clock pulsed during which a "0", a "1", and a "0" are shifted into the shift register 44 as the addressing shift register 316 is advanced to control the address encoder to select the second bar register 303, the second space register 304, and the third bar register 305. At this time, the signal MCDR/ becomes high by the resetting of the latch 475, and the character register 44 is isolated from the output of the comparator 42.

The illustrated decoder combining the control decoder 46 and the data decoder 48 of the schematic diagram of FIG. 1 continuously monitors for the presence of a valid start indication, either a start code read in a forward direction or stop code read in a reverse direction. Since a correct start code has been completely shifted into the character register 44, the ouptut signals DB1-DB5 represent a correct start code read in the forward direction to the decoder, and this decoder provides a low level output signal STF/ indicating the presence of a start code read in a forward direction. This signal is applied to one input of a NOR gate 434, the other input of which is supplied by the output of a NAND gate 432. The three inputs to the gate 432 include the signals SH, START/, and BLFF/. The BLFF/ is positive because the reader 14 has entered a white area. The signal START/ is positive because a start condition has not been established. The signal SH becomes positive for one clock pulse following removal of the low level signal MCDR/ so that the gate 432 is fully enabled for one clock pulse, and the NOR gate 432 provides a one clock pulse width positive-going signal which is applied to the clock terminal of a flip-flop 438 and also to the input of a NAND gate 442. The trailing edge of the pulse sets the flip-flop 438 so that a more positive forward signal FWD is provided, and the inverted signal FWD/ is applied to one input of a NAND gate 446 to provide a more positive signal START and a more negative signal START/ through a NAND gate 452. The signal START/ applies an inhibit to the gate 456 so that the signal WHC used to control the address encoder can no longer be generated under the control of the gate 456. Future signals WHC must now be generated under the control of the gate 454.

The gate 454 enabled by the signals START and BT3 will now supply the signal WHC for priming the address shift register 316 only after a start and when the signal BT3 is present, i.e., when the reader 14 enters the white area following the third black bar 16C in a code. This prevents addressing the multiplexer 40 for a width comparison other than in a sequence from the first bar register 301 to the third bar register 305.

The establishment of the signal FWD indicates to the system 10 that the message is being read in a forward direction, and the establishment of the signal START indicates that a start condition has been established and that future data derived from the record 12 by the reader 14 comprises message characters to be transferred through the data decoder 48 to the message register 50 and output device 52.

If the message on the record 12 has been read in a reverse direction so that the stop code was first encountered by the reader 14 and read in a reverse direction, the decoding of the start condition would take place in precisely the manner described above except that the decoder 46 would be presented with a combination of output signals DB1-DB5 from the character shift register 44 which would represent a stop code read in a reverse direction. In response to this input, the control portion 46 of the decoder would provide a more negative signal SPB/ representing a stop code read in a backwards direction. The signal SPB/ is effective through a NOR gate 436 also controlled by the NAND gate 432 to set a flip-flop 440. The setting of the flip-flop 440 provides a more positive signal BWD to indicate to the system 10 that the message is being read in a reverse or backwards direction. The inverted signal BWD/ is also effective through the gates 446 and 452 to provide an indication to the system 10 of a proper start condition in the form of a more positive signal START.

The above description assumed that the first bar encountered by the reader 14 in reading the message on the record 12 is the first bar 16A of the start code. There is, however, the possibility that a pencil line, for example, is inadvertently placed on the record preceding the message field which would be intercepted by the reader 14 and recognized as a black bar. This would mean that the width of the pencil line would be stored in the first bar register 301 and that the white space following the pencil line would be stored in the first space register 302. In like manner, the width of the first bar 16A of the space code would be stored in the second bar register 303, the width of the first valid space would be stored in the second space counter 304, and the width of the second space bar 16B in the start code would be stored in the third bar register 305. Under these conditions, it is obvious that a proper start condition could not be recognized when the reader 14 enters the white space immediately following the second bar. The system 10, however, is so constructed that continuous comparisons are made as each white area is entered by the reader until a proper start code is recognized.

More specifically, with the assumed example of a pencil line being first intercepted by the reader 14, completion of the loading of the third bar register 305 would not result in detection of a proper start code, and 9 the continuing movement of the reader 14 along the record in the white space following the second bar code would load the width of this white space into the third space counter 306. The first bar register 301 would then be cleared of the erroneous value resulting from the pencil line, and the value of the third bar 16C of the start code would be loaded into the first bar register 301. In addition, one-fifth of the value of the second space width loaded into the register 306 and one-fifth of the value of the third bar now loaded into the first bar register 301 would be added to the second comparison register 322. The first comparison register 321 would have been cleared and would now have standing therein one-fifth of the value stored in the first bar register 301. The third comparison register 323 would have one-fifth of the value standing in the registers 305, 306, and 301. Thus, the circuit 10 is in a condition now in which a correct start code is stored in the registers 303, 304, 305, 306, and 301, considered in that order, and a true virtual reference or average value is stored in the second comparison register 322.

As the reader 14 leaves the third bar 16C of the start code and enters the white area, the signal BT1 goes positive. This signal addresses the output steering circuit 318 to couple the true outputs of the second comparison register 322 to one set of inputs of the comparator 42. Further, when the signal WHC is generated, the more positive signal BT1 primes a binary "1" into the third stage of the shift register 316 so that the signal B2 is more positive. This signal is effective through the address encoder 314 to control the output steering circuit 40 so that the inverted outputs of the second bar register 303 are coupled to the other input of the comparator 42. Thus, the first bit to enter the character register 44 is the value determined by the width stored in the second bar register 303 which, in fact, is the first bar 16A of the start code. With the address shift register 316 primed to the condition identified above, subsequent clock pulses transfer in sequence the widths of the registers 304, 305, 306, and 301 to the comparator 42 which is continuously supplied with the output of the second comparison register 322. Accordingly, a valid start code read in the forward direction has now been shifted into the character register 44 and can be decoded by the decoder 46 to provide the valid start signal STF/. This same operation would be performed if, for example, a valid stop code is read in a reverse direction to generate the signal SPB/, as described above.

Accordingly, the circuit 10 continuously monitors the contents of the character register 44 following each item recognized as a black bar by the reader 14 until a valid start code is detected. This can occur with the timing shift register 500 in any of its three settings. However, when a valid start condition is detected, the timing shift register 500 is retimed so that during character recognition, only the first comparison register 321 is used, and use of the remaining comparison registers 322 and 323 and the third space width register 306 is discarded.

More specifically and as set forth above, the NOR gates 434 and 436 provide momentary positive-going pulses at their outputs when a start forward or a stop backward condition is detected. The outputs of these two gates are coupled through a pair of NAND gates 442 and 444 to two inputs of a NAND gate 448. Thus, whenever a proper start condition is recognized, the output of the gate 448 provides a positive-going pulse which is coupled through a NAND gate 450 to one input of a gate 417. The gate 417 provides a positive-going pulse or signal RTMC which is returned to the mode control terminal MC of the timing shift register 500. As set forth above, this primes the register 500 to a condition supplying the signal RT3/ which is immediately advanced to RT1/ as soon as the first transition into black is encountered by the reader 14, i.e., the first black bar in the first character code in the message.

This means that the width of the first black bar is always stored in the first bar register 301 with the following spaces and bars stored in the registers 302–305. It also means that the first comparison register 321 is always provided with one-fifth of the total number of clock pulses supplied to the counters 301–305 to provide a true virtual reference or average width for use by the comparator 42. It also means that the addressing shift register 316 is always primed to a condition on entering the white space following the third bar of a character code in which the output signal B1 is primed positive so that the multiplexer 40 first compares the bar width in the register 301 with the average value stored in the first comparator register 321.

Accordingly, when the end of the first character code is reached as the reader 14 moves into the white space following the third bar 16C, the five bits of the character are determined by the comparator and shifted into the character register 44 in the manner described above for the start code. This occurs during the generation of the signals SA–SF under the control of the shift register 472. The signal SH is next generated under the control of this shift register. If the message is being read in a reverse or backwards direction, the bits in the character register 44 are in reverse order and must be reversed in order before utilization by the character decoder portion 48. This is accomplished under the control of the signal SH. More specifically, this signal as well as the signals BWD, CLK, and BLFF/ are applied to the four inputs of a NAND gate 478. Since all of these signals are positive because the reader 14 is in a white area and the record 12 is being read in a reverse direction, the output of the gate 478 drops to a low level and is effective through a NAND gate 480 to provide a more positive signal CL. This signal is applied to the clock two terminal CLK2 of the character register 44. Since the signal MCDR/ is applied to the mode control terminal MC and is now at a high level, the output signals DB1-DB5 are read into the parallel input terminals A'-E' in inverted order so that the order of the bits in the character register 44 have now been inverted for presentation to the decoder. The data decoding portion 48 of the decoder converts the signals DB1–DB5 into binary coded decimal output signals C1, C2, C4, and C8 which are supplied to the parallel inputs of a shift register 338. On the next step of the shift register 472, the transfer of data from the shift register 338 into the message register 50 is initiated.

More specifically, when the shift register 472 arrives at its last position and generates a more positive signal SJ, a NAND gate 482 is completely enabled inasmuch as the other two inputs to this gate are provided by the signal START and BT3. The output of the gate 482 provides a load character signal LDCH/. This more positive signal is forwarded through a NOR gate 336 to apply a more positive signal to the mode control terminal MC of the shift register 338. The clock signal CLK applied to the clock two terminal CLK2 enables the parallel inputs to the shift register 338 so that the values of the decoded binary coded decimal signals C1, C2, C4, and C8 are stored in the shift register 338. On the next clock pulse, the shift register 472 removes the signal SJ and thus the signal LDCH/.

The record reading system 10 includes a control circuit 325 for counting four clock pulses following the signal SJ for serially shifting the four bits stored in the buffer shift register 338 into the message register 50. Thus, when the signal LDCH/ is present, the output of a NOR gate 326 rises to a more positive potential, and the trailing edge of this pulse on the disappearance of the signal LDCH/ sets a flip-flop 328 so that a more positive potential is applied to the NOR gate 326 to inhibit this gate. This more positive potential also removes the reset clamp from a mod 4 counter 330 and from the reset terminal of a flip-flop 332. The more negative potential from the $\overline{Q}$ terminal of the flip-flop 328 enables a NOR gate 334 so that the signal CLK/ can be forwarded through this gate to be applied to the shift clock terminal CLK1 of the buffer register 338. Thus, the next four signals CLK/ shift the bits stored in the buffer register 338 into the message register 50. The message register 50 comprises a series of serially connected shift register stages controlled by a mode control terminal MC which is supplied with the signal FWD which is positive when the message is read in a forward direction. When the signal FWD is at a high level, the bits in the buffer register 338 are clocked into the right-hand end of the message register 50 by signals applied to the clock one and clock two terminals CLK1 and CLK2 from the output of the NOR gate 334. Alternatively, if the message is being read in a reverse direction and the signal FWD is at a low level, the bits shifted out of the buffer register 338 are shifted left by the signals from the output of the NOR gate 334 from the left-hand input of the register 50. These characters or digits can be displayed as entered or upon completion of the reading of the complete message by the output device or display 52.

The clock signals CLK which are 180° out of phase with the signals CLK/ used to shift bits into the register 50 are applied to the counting input of the mod 4 330. Accordingly, after four clock signals CLK have been counted, the mod 4 counter 330 sets the flip-flop 332 so that a more negative potential is applied to the reset input of the input flip-flop 328. This clears the input flip-flop to remove the inhibit from the NOR gate 326 and to inhibit the NOR gate 334. Thus, additional shift pulses cannot be applied to the buffer shift register 338 or the message register 50. In addition, the resetting of the input flip-flop 328 supplies a reset signal to the mod 4 counter 330 and the flip-flop 332 so that these units are restored to a normal condition and held in this condition until the input flip-flop 328 is next set.

The above-described operations continue as the reader 14 is advanced along the record 12 so that the various five bit character codes are interpreted or translated and shifted through the register 44, the decoder 46, and the buffer shift register 338 into the message register 50. This operation continues until such time as the reader 14 detects a valid stop code. This stop code can comprise a start code read in a reverse direction or a stop code read in a forward direction.

If a stop code read in a forward direction is detected by the control portion 46 of the decoder, a more negative signal SPF/ is developed as the reader 14 enters the white area at the end of the message field. The signal SPF/ is applied to one input of a NOR gate 402. Another input to this gate is provided by the negative signal FWD/ which indicates that the record is being read in a forward direction. The remaining input to the gate 402 is coupled to the output of a NAND gate 404 whose two inputs are provided by the signals SH and BT3. The signal BT3 is positive only following the third bar of a code which is the correct time to detect a valid stop condition. Thus, when the signal SH goes positive, the output of the gate 404 drops to a more negative value, and the output of the gate 402 becomes more positive. This output is coupled through a NOR gate 408 to apply a more negative signal to one input of a NAND gate 412. This drives the output of the gate 412 to a more positive potential and is effective through a NOR gate 414 to provide a more negative signal to the input of a one-shot multivibrator 416. When the circuit 416 is set, a more negative signal NS/ is applied to one input of the gate 417 to provide a positive-going signal RTMC. This signal, as set forth above, retimes and resets the timing shift register 500. The negative-going signal NS/ is also returned to one input of the NAND gate 412 to maintain the output of the NOR gate 414 at a low level. The output from the gate 414 provides a reset signal RES/ which is applied to the clear or reset terminals of the flip-flops 438 and 440. This resets these flip-flops to remove the previously stored indication of a proper start condition. The signal RES/ returns to a more positive level as soon as the circuit 416 times out. This completes the return of the system 10 from its reading mode to its scanning mode by preventing further generation of the signals CL and LDCH and by transferring control over the signal WHC from the gate 454 to the gate 456.

The same restoration of the system 10 from its reading mode to its scanning mode is accomplished by detecting a start code read in a reverse direction. When this occurs, the control portion 46 of the decoder provides a more negative signal STB/ which is applied to one input of a NOR gate 406. The other inputs are provided by the output of the gate 404 and the signal BWD/. Thus, the gate 406 is used when the record is being read in a backwards direction, and the signal STB/ appears. The output of the NOR gate 406 is effective through a NOR gate 410 to control the NAND gate 412 to produce the same function as when this gate is controlled by the NOR gate 408.

The system 10 also includes a number of error checking features. More specifically, the bit outputs from the character register 44 are applied to a conventional parity check circuit 340 (FIG. 3). This can be constructed of half-adders in the usual manner. Whenever a parity error is detected, a more positive signal PAR is developed. This signal is applied to one input of a NAND gate 418. The other inputs to this gate comprise the signals SH, START, and BT3. Accordingly, during the cycle of the shift register 472 in which the parity error occurs and only when a start condition has been established and the white space following the third bar has been entered (signal BT3 is high), the gate 418 is fully enabled to provide a more negative signal to one input of a NAND gate 420 which, together with a NAND gate 422, provides a latch 419. The low level output from the gate 418 sets the latch so that the output of the gate 420 rises to a more positive level and is effective through the NOR gate 414 to provide a negative-going reset signal RES/. This resets the flip-flops 438 and 440 to remove a proper start indication from the system and also causes generation of the signal RTMC in the manner described above so that timing of the shift register 500 is reset. This condition remains until such time as a signal OVF/ is generated and applied to one input of the gate 422. This resets the latch and terminates the reset signal RES/. The signal OVF/ is generated whenever one of the width counters 301–306 or one of the comparison counters 321-323 goes into an overflow condition. This condition will occur whenever the reader 14 is moved away from the record 12 inasmuch as the level of the unit 20 remains in a fixed state and permits clock pulses to run continuously into one of the counters.

The system 10 also includes means for preventing reading of the record 12 whenever one of the width counters 301–306 or one of the comparison counters 321–323 goes into an overflow condition. In FIG. 3 of the drawings, two overflow detecting flip-flops 310 and 324 are illustrated coupled to the last stage of the counters 301 and 321, respectively. Similar overflow detecting flip-flops are provided for the remaining counters 302–306, 322, and 323. Accordingly, whenever any one of the counters 301-306 or 321-323 goes into an overflow condition, a flip-flop similar to the flip-flops 310 and 324 is set to provide a more negative signal OVF/. This signal is applied to one input of the NAND gate 412 (FIG. 4) so that the reset signal RES/ is again developed to both remove the start indication from the system 10 and to generate the signal RTMC for retiming the timing shift register 500. This signal remains until such time as a white to black or black to white transition is encountered whenever a new attempt to read the record 12 is made.

More specifically and as set forth above, a signal BWOS/ drops to a more negative level at the output of the gate 470 each time that a transition occurs in the output level of the unit 20. This more negative signal clears or resets a flip-flop 308 so that a more negative potential is applied to the reset terminals of all of the overflow flip-flops 310 and 324. This drives the overflow signal OVF/ to a more positive level and terminates the reset signal RES/. The clock input of the resetting flip-flop 308 is supplied with the signal SJ so that when this signal is generated by the shift register 472 following the transition resulting in the signal BWOS/, the flip-flop 308 is set to apply a more positive potential to the reset terminals of the overflow flip-flops 310 and 324 so as to permit them to detect subsequent overflow conditions.

Although the present invention has been described with reference to a single illustrative embodiment thereof, it should be understood that numerous other modifications and embodiments can be devised by those skilled in the art that will fall within the spirit and scope of the principles of the present invention. Included among these are the use of the method and system with areas intensity modulated in color and magnetic strength, and arrangements in which only bars or only spaces are intelligence modulated. Further, the virtual reference or average can be established using less than all of the bits of a complete character code with somewhat of a degradation of reliability.

What is claimed as new and desired to be secured by Letters Patent of the United States is:

1. A method of interpreting records coded with areas of different magnitudes representing different code values which comprises the steps of determining and separately storing the magnitudes of each of a given number N of areas where N is an integer greater than two and where at least two of the N areas differ in magnitude from one another;

determining the average magnitude of all of the N areas;

thereafter comparing the determined average magnitude with the stored magnitude of each of the individual areas to determine the relation therebetween;

and assigning a code value to the areas in accordance with the determined relation.

2. A method of interpreting records coded with areas of different sizes and with N areas representing an individual character, where N is an integer greater than two and where at least two areas in each character differ from one another in size, which method comprises the steps of determining and separately storing the size of each of a given number N of areas which together represent an individual character, establishing a reference value based on the sizes of all of said given number N of areas, and thereafter determining the code values of the individual areas of said individual character in accordance with the relation between the stored sizes of the N individual areas and the reference value.

3. The method set forth in claim 2 in which the step of determining the size of each area includes counting clock pulses for a period proportional to area size, and the step of establishing the reference value includes counting the same number of clock pulses used in determining area size but divided by said given number N.

4. A method of interpreting records coded with areas of different sizes representing different code bits which comprises the steps of determining and separately storing the size of each of a given number N of areas where N is an integer greater than two and where at least two of the N areas in each set of N areas differ in magnitude from one another, determining the average size of all of said given number N of areas, thereafter comparing the determined average size with the stored size of each of the N individual areas to establish a greater than or less than relation therebetween, and producing different code bit indications in accordance with the established greater than and less than relation.

5. A method of interpreting records coded with alternate areas of different characteristics in which the areas have two different widths corresponding to binary "0"s and "1"s, which method comprises the steps of producing a number N of first values each representing the width of one of N areas, N being an integer greater than two and at least two of the N areas differing from one another in width, producing a second value in dependence on the total width of all of said number N of areas, thereafter comparing the second value with each of the N first values to establish corresponding greater than and less than relations, and producing binary "0" and "1" indications in dependence on the established greater than and less than relations.

6. A method of interpreting bar coded records using an optical reader wherein the bar code uses different widths to represent the binary bits "0" and "1" and a given number N of binary bits to encode a character, N being an integer greater than two, and each such character including at least one "0" bit and at least one "1" bit, the method comprising the steps of producing relative movement between the record and the optical reader to produce a series of N bit signals representing the different widths forming an encoded character, establishing a virtual reference width value in dependence on the N bit signals, storing the virtual width value, and thereafter comparing each of the N bit signals against the stored virtual reference width value to establish the "0" and "1" significance of the bit signals.

7. A method of interpreting bar coded records using an optical reader wherein the bar code uses different widths to represent the binary bits "0" and "1" and a given number N of binary bits to encode a character, N being an integer greater than two, and each character including at least one "0" bit and at least one "1" bit, the method comprising the steps of producing relative movement between the record and the optical reader to produce a series of N bit signals, selectively counting a given number of clock pulses under the control of the N bit signals to establish and store the values of N different widths forming an encoded character, counting said given number of clock pulses divided by N to establish and store a virtual reference width value, and thereafter comparing each of the N different stored width values with the stored virtual reference width value to establish the "0" and "1" significance of the bit signals.

8. A method of interpreting records coded with areas of different sizes and with N areas representing an individual fixed-width character, where N is an integer greater than two and where at least two areas in each character differ from one another in size, which method comprises the steps of determining and separately storing the size of each of a given number N of areas which together represent an individual character, establishing a reference value proportional to the sizes of all of said given number N of areas, and thereafter determining the code value of the individual areas of said individual character in accordance with the relation between the stored sizes of the N individual areas and the reference value.

* * * * *